March 4, 1952     A. O. LUNDELL     2,588,259
DEHAIRING APPARATUS FOR HOG CARCASSES
Filed Sept. 2, 1949     5 Sheets-Sheet 1

Inventor
Alvin O. Lundell
By Fred Gerlach atty.

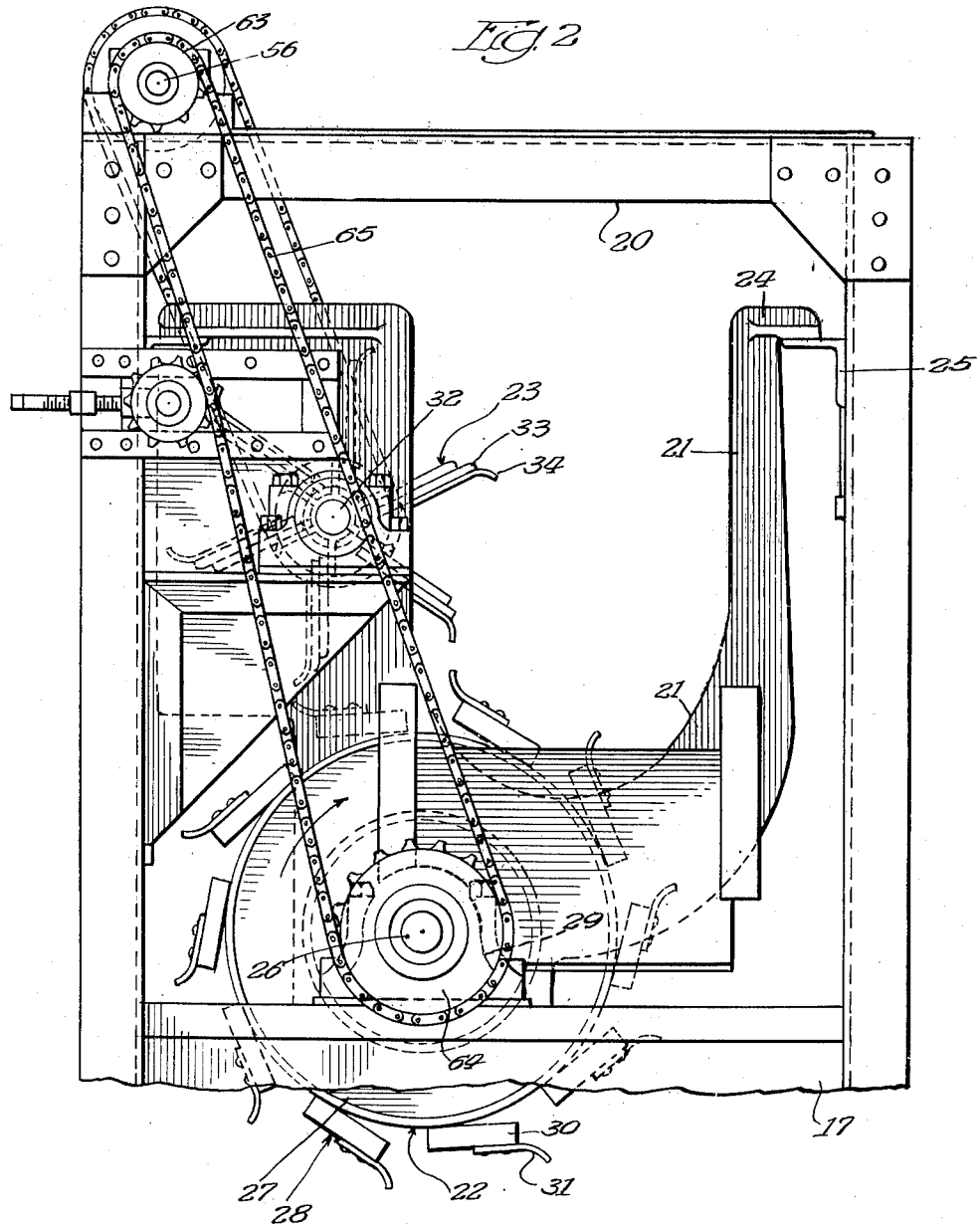

March 4, 1952 A. O. LUNDELL 2,588,259
DEHAIRING APPARATUS FOR HOG CARCASSES
Filed Sept. 2, 1949 5 Sheets-Sheet 3
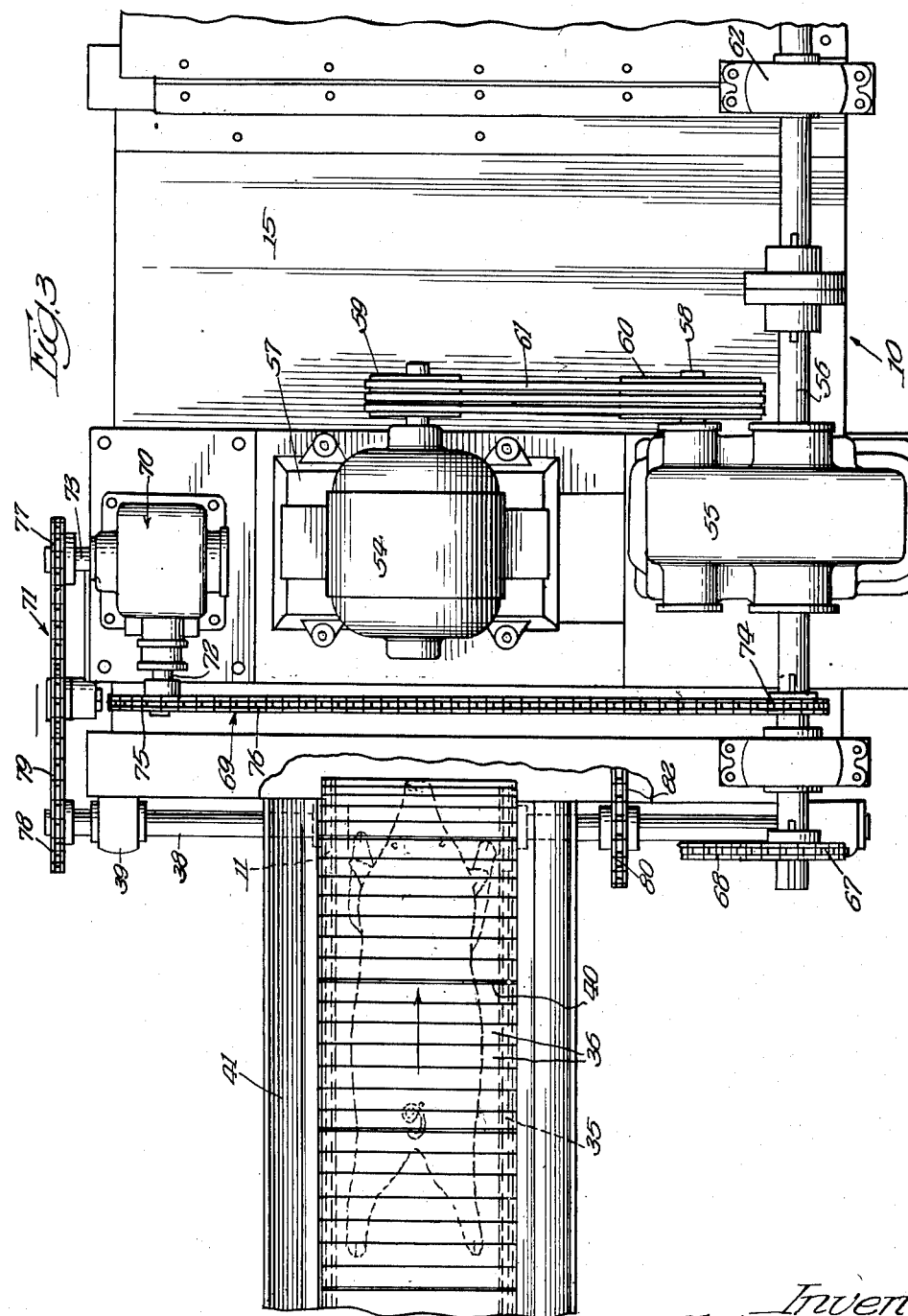
Inventor
Alvin O. Lundell
By: Fred Herled Atty.

March 4, 1952 A. O. LUNDELL 2,588,259
DEHAIRING APPARATUS FOR HOG CARCASSES
Filed Sept. 2, 1949 5 Sheets-Sheet 4
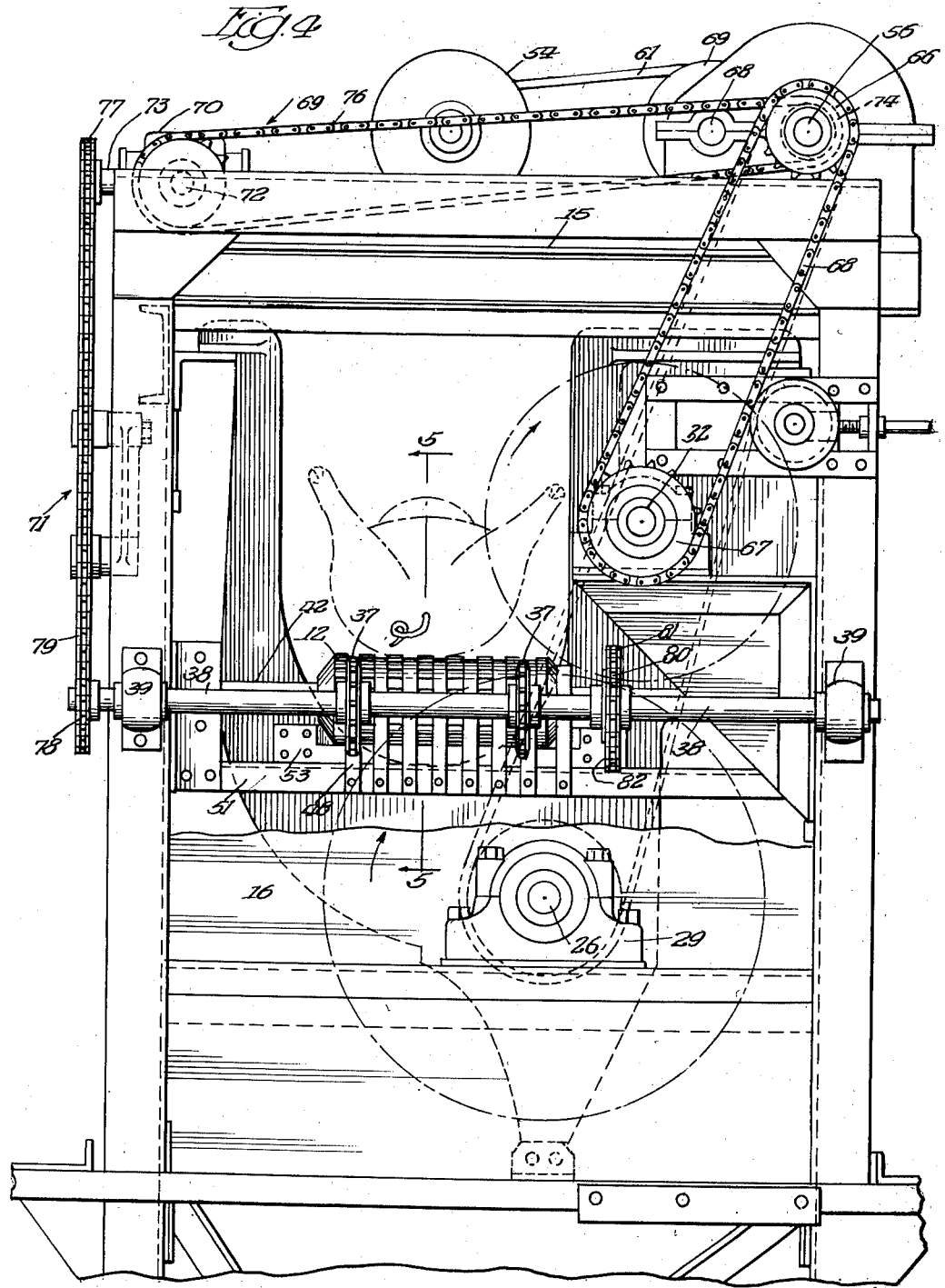

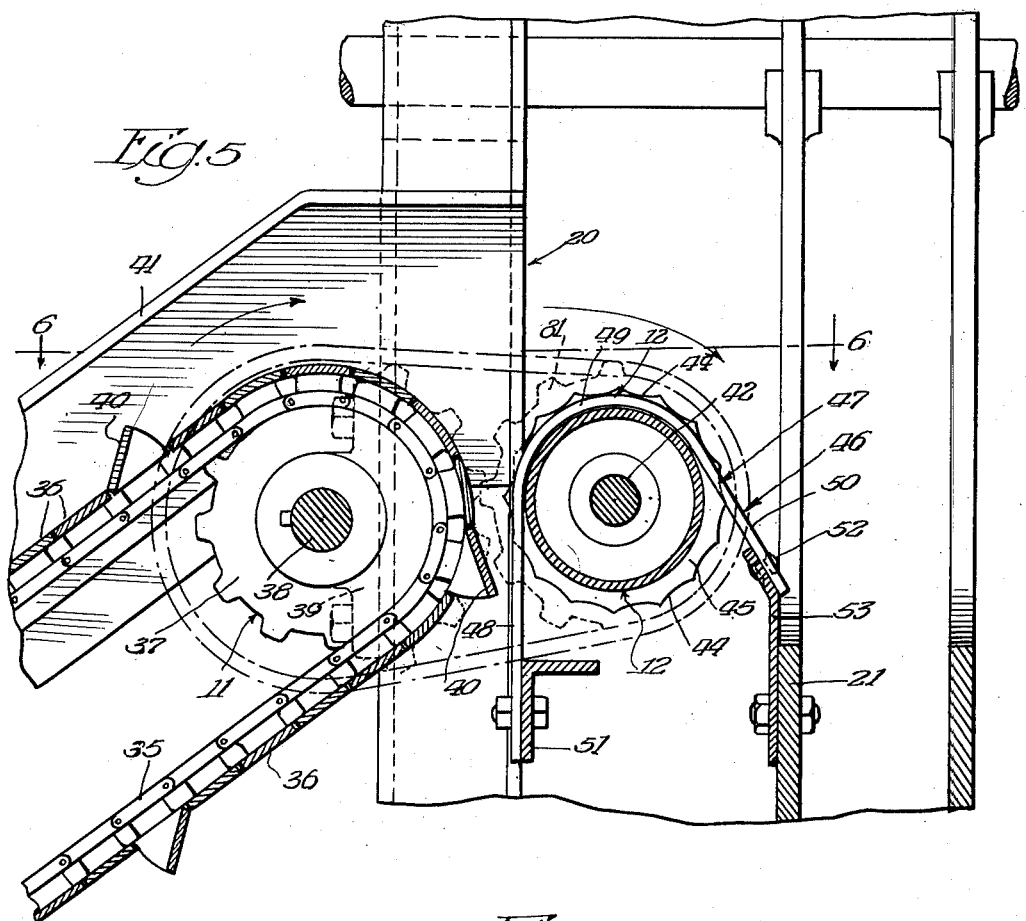
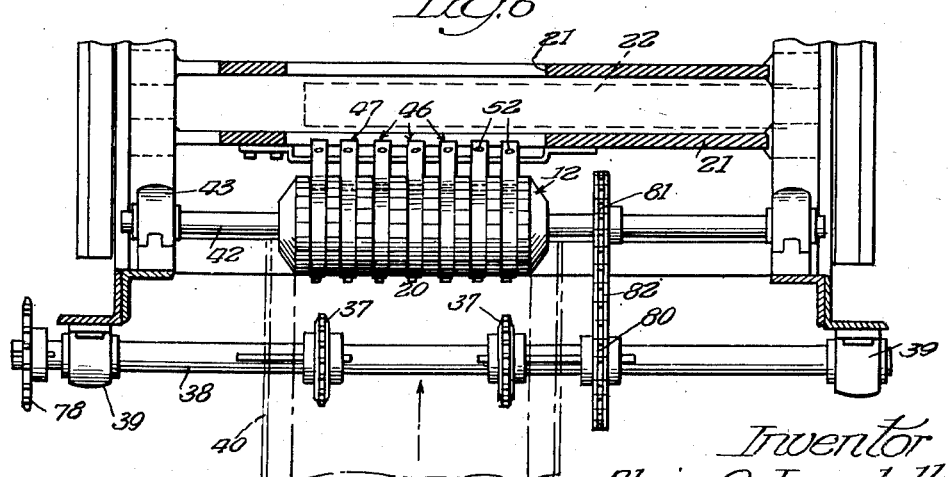

Patented Mar. 4, 1952

2,588,259

UNITED STATES PATENT OFFICE 2,588,259

DEHAIRING APPARATUS FOR HOG CARCASSES

Alvin O. Lundell, Chicago, Ill., assignor to The Allbright-Nell Company, Chicago, Ill., a corporation of Illinois Application September 2, 1949, Serial No. 113,820

2 Claims. (Cl. 17—16)

The present invention relates generally to apparatus for dehairing hog carcasses after scalding thereof. More particularly the invention relates to that type of apparatus which is designed primarily for use in a large sized commercial slaughtering house, operates automatically to effect dehairing of the carcasses and comprises: (1) a combined scraping and polishing unit in the form of a horizontally elongated housing which has a carcass inlet at one end and an outlet at its other end, is adapted to have the scalded carcasses move successively therethrough in lengthwise fashion or manner and has disposed longitudinally within it a horizontal series of spaced apart, upstanding, carcass supporting or confining U-bars, a horizontally disposed, rotary beater equipped scraping device disposed beneath the U-bars and arranged so that the beaters on its upper portion extend between and swing through the spaces between the lower portions of the U-bars and a horizontally disposed rotary beater equipped polishing device located at one side of the U-bars and arranged so that the beaters on its inner side portion extend between and swing through the spaces between the adjacent side portions of the U-bars; (2) an endless conveyor which extends upwards from the discharge end of a scalding tank in front of the combined scraping and polishing unit and is adapted, after scalding of the carcasses in the tank, to feed the carcasses, one at a time and in lengthwise fashion, into the inlet of the unit housing; (3) a horizontal feed roll which is disposed in the unit housing between the inlet and the first U-bar and serves to feed the carcasses from the upper discharge end of the conveyor into the U-bars where they are subjected to the action of the scraping and polishing devices; and (4) motor driven gearing for conjointly driving the rotary scraping and polishing devices, the endless conveyor and the feed roll.

It is customary in a dehairing apparatus of this type to flute the feed roll between the discharge end of the upwardly inclined endless conveyor and the first U-bar in order that it has an irregular surface or periphery and hence in connection with successive feeding of hog carcasses so grips the carcasses as to effect an efficient feed into the horizontal series of spaced apart U-bars. In practice it has been found that a dehairing apparatus of the type under consideration effectively fulfills its intended purpose but is subject to the objection that there is a tendency in certain instances for the carcasses in passing over the longitudinally fluted power driven feed roll to follow around the feed roll. In the event that portions of a carcass, such, for example, as the feet and under or belly parts, follow around the feed roll they become crushed and in some cases so wedge themselves between the under portion of the feed roll and the adjacent parts of the housing of the combined scraping and polishing unit that the feed roll is stopped and results in break down and stoppage of the apparatus as a whole. A crushed carcass constitutes material waste and the time consumed in rendering the apparatus again operative is costly.

One of the principal objects of this invention is to eliminate the defects in, and the objections to, a dehairing apparatus of the aforementioned type. This object is attained by the provision of a comb variety device which is associated with the longitudinally fluted feed roll and serves positively to prevent any portion of the carcass being fed by the feed roll into the U-bars from following around the roll and becoming crushed due to wedging between the bottom portion of the roll and the adjacent structural parts of the housing of the combined scraping and polishing unit. By preventing the carcasses, in connection with feed from the discharge end of the endless conveyor into and through the horizontal series of U-bars, from following around the feed roll material wastage and shut down time are eliminated.

Another object of the invention is to provide a dehairing apparatus in which the comb device which is associated with the longitudinally fluted feed roll between the discharge end of the endless conveyor and the U-bars is in the form of a horizontal series of equidistantly spaced, inverted U-shaped, stiff metal strips which comprise substantially vertically extending front parts in front of the feed roll, arcuate intermediate parts fitting within the upper portions of annular grooves in the feed roll and downwardly and rearwardly inclined rear parts leading to the lower portion of the first U-bar.

A further object of the invention is to provide a dehairing apparatus of the last mentioned character in which the downwardly and rearwardly inclined parts of the strips constituting the comb device are fixedly connected to a horizontal bar which is attached directly to the bottom portion of the first U-bar.

A still further object of the invention is to provide a dehairing apparatus which is generally of new and improved construction, involves a novel arrangement of parts and is characterized by extremely high efficiency and speed of operation.

Other objects of the invention and the various advantages and characteristics of the present apparatus for dehairing hog carcasses will be apparent from a consideration of the following detailed description.

The invention consists in the several novel features which are hereinafter set forth and are more particularly defined by claims at the conclusion hereof.

In the drawings which accompany and form a part of this specification or disclosure and in which like numerals of reference denote corresponding parts throughout the several views:

Figure 2 is a rear elevation illustrating in detail the construction and arrangement of the U-bars within the housing of the combined scraping and polishing unit and showing the manner in which the rotary beater equipped scraping device is connected for drive;

Figure 3 is a fragmentary top plan view disclosing in detail the construction and arrangement of certain parts of the motor driven gearing for conjointly driving the rotary scraping and polishing devices, the endless conveyor and the horizontal feed roll between the discharge end of the conveyor and the first U-bar in the housing of the combined scraping and polishing unit;

Figure 4 is a vertical transverse section taken on the line 4—4 of Figure 1 and illustrating in detail the construction, design and arrangement of the longitudinally fluted feed roll and the comb device that is associated therewith and serves to prevent any portion of the hog carcass being fed by the roll from following around the roll and becoming crushed;

Figure 5 is an enlarged vertical section taken on the line 5—5 of Figure 4 and showing the construction and manner of mounting of the horizontal series of equi-distantly spaced, inverted U-shaped strips constituting the comb device for the feed roll; and Figure 6 is a reduced horizontal section on the line 6—6 of Figure 5.

Figure 1:
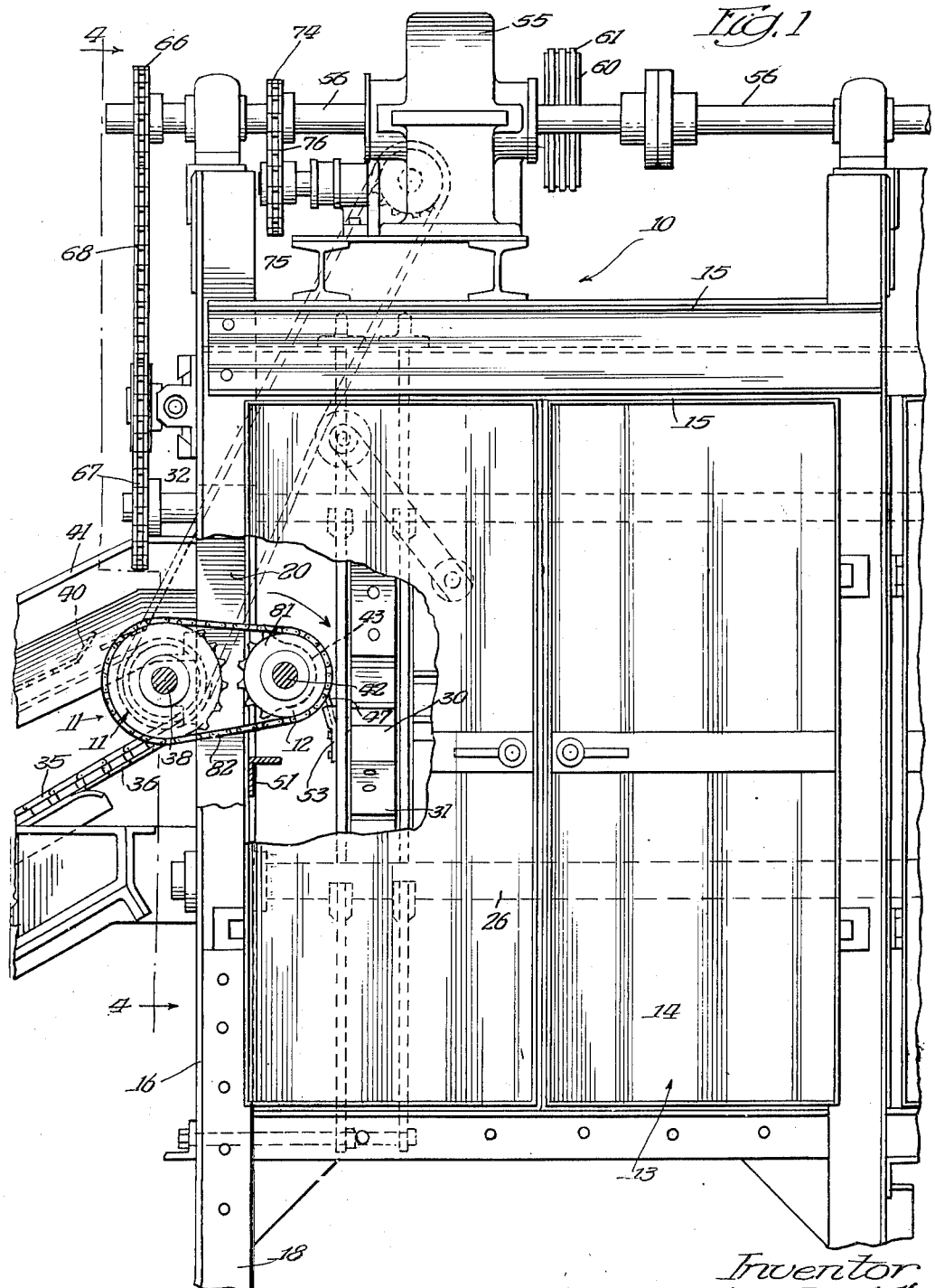
Figure 1 is a fragmentary side view of a hog dehairing apparatus embodying the invention, certain parts being broken away for purposes of illustration.

The apparatus which is shown in the drawing constitutes the preferred form or embodiment of the invention. It is designed primarily for use in a large sized slaughtering house and serves as a medium or instrumentality for removing hair from hog carcasses after scalding thereof. As its principal components or parts the dehairing apparatus comprises a combined scraping and polishing unit 10, an endless conveyor 11 and a feed roll 12. As hereinafter described more in detail, the hog carcasses to be dehaired are conveyed one at a time and in lengthwise fashion by the conveyor to the feed roll and the latter feeds the carcasses into the unit 10.

The combined scraping and polishing unit 10 comprises a horizontally elongated housing 13 which is adapted, in connection with operation of the apparatus, to have the hog carcasses pass successively and longitudinally through it, and comprises a pair of spaced apart side walls 14, a top wall 15, a front wall 16 and a rear wall 17. Preferably the housing 13 is supported is an elevated position by legs 18 and consists of structural metal parts and panels. The front wall 16 of the housing has in the upper portion thereof a carcass inlet 19 and the rear wall 17 is provided with an outlet 20 through which the carcasses are discharged after being dehaired within the housing, as hereinafter recited. In addition to the housing 13 the scraping and polishing unit 10 comprises a horizontal series of equidistantly spaced U-bars 21, a rotary scraping device 22 and a rotary polishing device 23. The series of U-bars 21 is disposed in, and extends lengthwise of, the housing 13 and serves to support and confine the carcasses in connection with movement through the housing from the inlet 19 to the outlet 20. The bars 21 embody at the upper or free ends of the side portions thereof laterally extending lugs 24 which, as best shown in Figures 2 and 4, rest on angle bars 25. The latter are suitably fixed connected to the upper portions of the housing side walls 14. The rotary scraping device 22 of the unit 10 extends horizontally and is disposed in the housing 13 adjacent the lower portions of the U-bars 21. It is driven as hereinafter described and consists of a shaft 26, a drum 27 and beaters 28. The shaft 26 extends lengthwise of the housing and has the ends thereof journalled in bearings 29 which are suitably mounted within the housing. The drum 27 extends around, and is fixedly connected to, the shaft so that it is rotatable therewith. The beaters 28 consist of elongated rubber blocks 30 and steel blades 31 and are arranged in the form of spaced apart, annular series on the outer periphery of the drum 27. The rubber blocks 30 extend substantially tangentially with respect to the drum and have the ends thereof that are nearer the drum axis connected fixedly to the drum by bolts or rivets. The steel blades 31 are connected to, and project outwards from, the other ends of the rubber blocks. The annular series of beaters 28 are positioned between the U-bars in order that during drive of the scraping device the beaters on the upper portion of the drum swing through the spaces between the lower portions of the U-bars and subject the carcasses moving through the series of U-bars to a dehairing action. The arrangement of the beaters 28 is such that they operate automatically to feed the carcasses rearwards through the U-bars. The beaters of the scraping device 22 operate to roll the carcasses as well as feed them rearwards while at the same time ridding them of hair. The polishing device 23 is disposed within, and extends lengthwise of, the housing and is positioned over the scraping device 22 and adjacent one side of the U-bars. It is driven, as hereinafter described, and consists of a horizontal shaft 32 and spaced apart, annular series of radially extending beaters 33. The shaft 32 has the ends thereof journalled in suitably supported bearings and is located outwards of the adjacent side portions of the U-bars 21. The annular series of beaters 33 are disposed between the U-bars. As best shown in Figure 2, the beaters 33 have arcuate steel blades 34 at their outer ends. During drive of the polishing device the beaters on the inner side portion of the device swing through the spaces between the adjacent side portions of the U-bars and serve to effect cleaning of the heads and under parts of the legs of the carcasses in transit through the U-bars. The scraping and polishing unit 10 is essentially standard or conventional.

The endless conveyor 11 is located in front of the combined scraping and polishing unit 10 and serves to feed the carcasses to be dehaired from a scalding tank (not shown) into the inlet 19 in the upper portion of the front wall 16 of the housing 13. It is upwardly inclined and consists of a pair of side by side endless chains 35, and narrow side by side plates 36 between the two chains. The upper ends of the chains are disposed adjacent the lower portion of the carcasses inlet 19 and extend around a pair of drive sprockets 37. The latter are mounted on a horizontal shaft 38, the ends of which are journalled in bearings 39 on the front wall of the housing 13 of the combined scraping and polishing unit 10. The plates 36 of the endless conveyor 11 extend transversely of the two chains 35 and are suitably connected to the outer portions of the links of the chains. Certain of the plates 36 are provided with angularly disposed flights 40 for carcass propelling purposes. The lower end of the conveyor is located in the discharge end of the scalding tank. It is contemplated that after scalding the carcasses will be placed, one at a time, upon the lower end of the upper reach of the conveyor 11. In connection with drive of the conveyor the carcasses are fed upwards and are discharged through the inlet 19 in the front wall of the housing 13. The shaft 38 on which are mounted the drive sprockets 37 is driven in a clockwise direction as viewed in Figure 5 to the end that the upper reach of the conveyor travels upwards and the lower reach travels or moves downwards in the direction of the scalding tank. As shown in Figures 1 and 3 two upwardly inclined plates 41 are located at the sides of the conveyor 11. Such plates serve as guides for the carcasses during feed of the latter on the upper reach of the conveyor.

The feed roll 12 extends horizontally and is located directly rearwards of the upper discharge end of the endless conveyor 11. It is mounted on, and fixedly connected to, a horizontal shaft 42, and, as shown in Figure 5, is positioned upwards and slightly forwards with respect to the lower portion of the first U-bar 21. The shaft 42 is disposed inwards of the front wall 16 of the housing of the combined scraping and polishing unit 10 and has the ends thereof journalled in bearings 43. The latter are suitably mounted on the side portions of the housing front wall 16. The feed roll 12 has longitudinally extending, equidistantly spaced flutes 44 in order that it has an irregular surface or periphery and hence in connection with successive feeding of hog carcasses so grips the carcasses as to effect efficient feed from the discharge end of the conveyor into the horizontal series of spaced apart U-bars 21. In addition to the flutes 44 the feed roll 12 has a plurality of equidistantly spaced annular grooves 45. The latter are of rectangular cross section and extend from one end of the feed roll 12 to the other, as shown in Figure 6. It is contemplated that the feed roll 12 will be driven in a clockwise direction as viewed in Figure 5 in order that at the top portion thereof it effects the desired feed of the carcasses from the conveyor over the lower portions of the frontmost U-bars 21.

In addition to the parts heretofore mentioned the dehairing apparatus comprises a comb device 46 and mechanism in the form of motor driven gearing for conjointly driving the scrapping and polishing devices 22 and 23, the endless conveyor 11 and the feed roll 12.

The comb device 26 constitutes the essential point of novelty of the present dehairing apparatus and serves positively to prevent any portion of the carcasses being fed by the feed roll into the U-bars from following around the roll and becoming crushed or damaged. It is associated with the feed roll and consists of a horizontal series of equidistantly spaced, inverted U-shaped, stiff metal strips 47. The latter correspond in number to, and are aligned respectively with, the annular grooves 45 in the feed roll 12 and embody vertically extending front parts 48, arcuate intermediate parts 49 and downwardly and rearwardly inclined rear parts 50. The lower ends of the front parts 48 of the strips 47 are bolted or otherwise fixedly secured to a horizontal angle bar 51 which extends across, and is disposed inwards of, the central portion of the front wall 16 of the housing 13. The upper ends of the front parts 48 of the strips 47 are located adjacent the front portion of the feed roll 12. The arcuate intermediate parts 49 of the strips 47 fit within the upper portions of the annular grooves 45 and are of such thickness that the longitudinal ridges which are formed in the periphery of the feed roll as the result of the flutes 44 project therebeyond for carcass gripping purposes. The lower ends of the downwardly and rearwardly inclined rear parts 50 of the strips 47 of the comb device 46 terminate adjacent the lower portion of the first U-bar 21 and are fixedly connected by rivet 52 or other suitable attaching devices to the upper portion of a horizontally extending plate 53. The lower portion of said plate extends across the front face of, and is bolted to, the upper portion of the first U-bar 21. The upper portion of the plate 53 is upwardly and forwardly inclined so that it extends at the same angle as the lower ends of the rearwardly and downwardly inclined rear parts 50 of the strips 47. When a carcass to be dehaired is fed by the feed roll 12 into the U-bars the rear parts 50 of the strips 47 constituting the comb device 46 strip or comb the carcass from the rear portion of the feed roll and thus prevent any portion of the carcass from following around the feed roll and becoming crushed and wedged between the feed roll and the adjacent structural parts of the housing of the combined scraping and polishing unit 10.

The mechanism for conjointly driving the scraping and polishing devices 22 and 23, the endless conveyor 11 and the feed roll 12 comprises an electric motor 54, a speed reducer 55 and a shaft 56. The electric motor 54 is mounted on a bed plate 57 on the top wall 15 of the housing 13 and is arranged so that the armature shaft thereof extends lengthwise of the housing. The speed reducer 55 is mounted on the housing top wall at one side of the motor 54. It is of the gear type and embodies a drive shaft 58 in parallel relation with the armature shaft of the motor. A pulley and belt connection in the form of a pulley 59 on the armature shaft of the motor 54, a pulley 60 on the drive shaft 58 of the speed reducer 55 and belts 61 around the two pulleys serves to drive the speed reducer from the motor. The shaft 56 extends lengthwise of the housing and forms the driven part of the speed reducer 55. It is located over one side of the housing top wall 15 and is journalled in bearings 62. The scraping device 22 is driven from the shaft 56 by a sprocket and chain connection which consists of a sprocket 63 on the rear end of the shaft 56, a sprocket 64 on the rear end of the shaft 25 and an endless chain 65 around the two sprockets 63 and 64. The polishing device 23 is driven from the shaft 56 by means of a sprocket and chain connection which comprises a sprocket 66 on the front end of the shaft 56, a sprocket 67 on the front end of the shaft 32 and an endless chain 68 around the two sprockets 66 and 67. The endless conveyor 11 is driven from the shaft 56 by way of a sprocket and chain connection 69, a bevel gear variety speed reducer 70, and a sprocket and chain connection 71. The speed reducer 70, as shown in Figure 3, is mounted on the housing top wall 15 at one side of the electric motor 54 and embodies a drive shaft 72 and a driven shaft 73. The sprocket and chain connection 69 comprises a sprocket 74 on the shaft 56, a sprocket 75 on the drive shaft 72 of the speed reducer 70 and an endless chain 76 around the two sprockets 74 and 75. The driven shaft 73 of the speed reducer 70 extends transversely of the unit 10 and is in parallel relation with the shaft 38 on which the drive sprockets 37 are mounted. The sprocket and pulley connection 71 comprises a sprocket 77 on the driven shaft 73 of the speed reducer 70, a sprocket 78 on one end of the shaft 38 and an endless chain 79 around the two sprockets 77 and 78. The feed roll 12 is driven by means of a sprocket and chain connection comprising a sprocket 80 on the shaft 38, a sprocket 81 on the shaft 42 and an endless chain 82 around the two sprockets 80 and 81. When the electric motor 54 is in operation as the result of the supply of electric current thereto the aforementioned gearing operates to effect conjoint drive of the scraping and polishing devices 22 and 23, the endless conveyor 11 and the feed roll 12.

When the apparatus is in operation the hog carcasses to be rehaired after passing through the aforementioned scalding tank are moved, one at a time and in lengthwise fashion, onto the lower receiving end of the endless conveyor 11. As heretofore pointed out, the conveyor feeds the carcasses into the housing inlet 19 and onto the upper portion of the feed roll 12. The latter, in turn, feeds the carcasses into the U-bars 21 where they are subjected to the dehairing action of the scraping and polishing devices 22 and 23. The carcasses move through the bars and are then, after dehairing, discharged from the unit 10 via the outlet 20 in the rear wall 17 of the housing 13. In connection with feed of the carcasses from the upper discharge end of the endless conveyor 11 into the U-bars 21 via the feed roll 12 the comb device 46 consisting of the inverted, U-shaped, equidistantly spaced strips 47 prevents the carcasses from following around the feed roll and the downwardly and rearwardly inclined rear parts of the strips guide the carcasses over the lower portions of the foremost U-bar.

The herein described dehairing apparatus is highly efficient in operation and this is directly attributable to the fact that it includes the comb device 46 which, as previously pointed out, eliminates crushing of any portions of the carcasses as they are fed to the U-bars.

The invention is not to be understood as restricted to the details set forth since these may be modified within the scope of the appended claims without departing from the spirit and scope of the invention.

Having thus described the invention what I claim as new and desire to secure by Letters Patent is:

1. In combination with a carcass dehairing apparatus of the type that comprises a horizontally elongated housing structure with a carcass inlet at its front end and an outlet at its rear end, a longitudinal series of transversely aligned spaced apart U-bars in the housing structure between the inlet and outlet, rotary beater equipped scraping and polishing devices in associated relation with the U-bars, a conveyor adapted to deliver the carcasses to be dehaired, one at a time, into the inlet and having its discharge end disposed adjacent said inlet, a horizontal rotary feed roll located in the housing structure between the discharge end of the conveyor and the first U-bar, positioned above the lower portion of the first U-bar, provided with a series of spaced apart annular grooves and adapted to support the carcasses and feed them toward said first U-bar, and motor driven gearing for driving the scraping and polishing devices and the feed roll, a comb device associated with the feed roll, operative to prevent any portion of the carcass being fed by the roll from following the roll around and also to guide the carcass downwards into the first U-bar, and embodying a series of spaced apart rigid strips corresponding in number to, and aligned respectively with, the grooves in said roll and comprising arcuate parts fitting within the upper portions of the grooves and inclined rear parts extending downwards and inwards from the upper rear portion of the feed roll and having the lower ends thereof fixedly secured in place adjacent the lower portion of said first U-bar.

2. In combination with a carcass dehairing apparatus of the type that comprises a horizontally elongated housing structure with a carcass inlet at one end and an outlet at its other end, a longitudinal series of spaced apart transversely aligned U-bars in the housing structure between the inlet and the outlet, rotary beater equipped scraping and polishing devices disposed adjacent certain portions of the U-bars and adapted to effect dehairing of carcasses during travel thereof through said U-bars, an upwardly inclined endless conveyor adapted to deliver the carcasses to be dehaired, one at a time, to the inlet and having its discharge end disposed adjacent said inlet, a horizontal longitudinally fluted rotary feed roll located in the housing structure between the discharge end of the conveyor and the first U-bar, positioned above the lower portion of the first U-bar, provided with a series of spaced apart annular grooves and adapted to support the carcasses and feed them towards the U-bars, and motor driven gearing for driving the scraping and polishing devices, the endless conveyor and the feed roll, a comb device associated with the feed roll, operative to prevent any portion of the carcass being fed by the roll from following the roll around and also to guide the carcass downwards into the first U-bar and embodying a series of spaced apart, inverted U-shaped strips corresponding in number to, and aligned respectively with, the grooves in said roll and consisting of vertically extending front parts having the upper ends thereof terminating adjacent the front portion of the roll and their lower ends fixedly secured in place, arcuate intermediate parts fitting within the upper portions of the grooves and inclined rear parts leading downwards and rearwards from the upper rear portion of the feed roll and having the lower ends thereof connected to said lower portion of the first U-bar.

ALVIN O. LUNDELL.

REFERENCES CITED

The following references are of record in the file of this patent:

UNITED STATES PATENTS

| Number | Name | Date |
|---|---|---|
| 764,702 | Birtwell | July 12, 1904 |
| 1,668,287 | Schmidt | May 1, 1928 |
| 2,397,570 | Smoker | Apr. 2, 1946 |